United States Patent
Doerr et al.

(10) Patent No.: US 6,549,313 B1
(45) Date of Patent: Apr. 15, 2003

(54) BROADBRAND ELECTRONIC N×N CROSS-CONNECT SWITCH USING TUNABLE LASERS

(75) Inventors: Christopher Richard Doerr, Middletown Township, Monmouth County, NJ (US); Corrado Pietro Dragone, Little Silver Township, Monmouth County, NJ (US); Alastair Malcolm Glass, Rumson Township, Monmouth County, NJ (US); Ivan P. Kaminow, Holmdel Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/400,240

(22) Filed: Sep. 21, 1999

(51) Int. Cl.[7] ................................ H04J 14/02
(52) U.S. Cl. ........................ 359/128; 385/16
(58) Field of Search ................. 359/128, 127, 359/130, 133; 385/16

(56) References Cited

U.S. PATENT DOCUMENTS

| | | | | |
|---|---|---|---|---|
| 5,373,517 A | | 12/1994 | Dragone et al. | |
| 5,450,224 A | * | 9/1995 | Johansson | ............... 359/128 |
| 5,739,935 A | * | 4/1998 | Sabella | ............... 359/128 |
| 5,751,868 A | * | 5/1998 | Bala et al. | ............... 385/16 |
| 5,774,245 A | * | 6/1998 | Baker | ............... 359/128 |
| 5,825,517 A | * | 10/1998 | Antoniades et al. | ......... 359/117 |
| 6,023,544 A | | 2/2000 | Dragone | |
| 6,061,482 A | * | 5/2000 | Davis | ............... 385/17 |
| 6,195,187 B1 | * | 2/2001 | Soref et al. | ............... 359/114 |
| 6,317,529 B1 | * | 11/2001 | Kashima | ............... 385/16 |
| 6,333,799 B1 | * | 12/2001 | Bala et al. | ............... 359/128 |
| 6,359,912 B1 | * | 3/2002 | Doerr et al. | ............... 372/4 |

* cited by examiner

*Primary Examiner*—John Tweel
(74) *Attorney, Agent, or Firm*—John A. Caccuro

(57) ABSTRACT

A programmable broadband N×N cross-connect switch includes an N×N wavelength coupler combined with N tunable lasers, N modulators and N optical receivers. Each of the N tunable lasers can selectively produce N different wavelengths. The coupler couples the N wavelengths to the N modulators. The N modulators modulate the N wavelengths using N input electrical signals, each modulator being selectable by choosing a laser wavelength. The N optical receivers receive and detect the N modulated wavelengths to produce N output electrical signals therefrom, each receiver receiving and detecting a different one of the N different wavelengths. By selecting a laser wavelength a particular modulator and receiver is selected so that a modulated signal, formed at the selected modulator when an input electrical signal modulates the selected wavelength, is switched to the selected receiver.

15 Claims, 15 Drawing Sheets

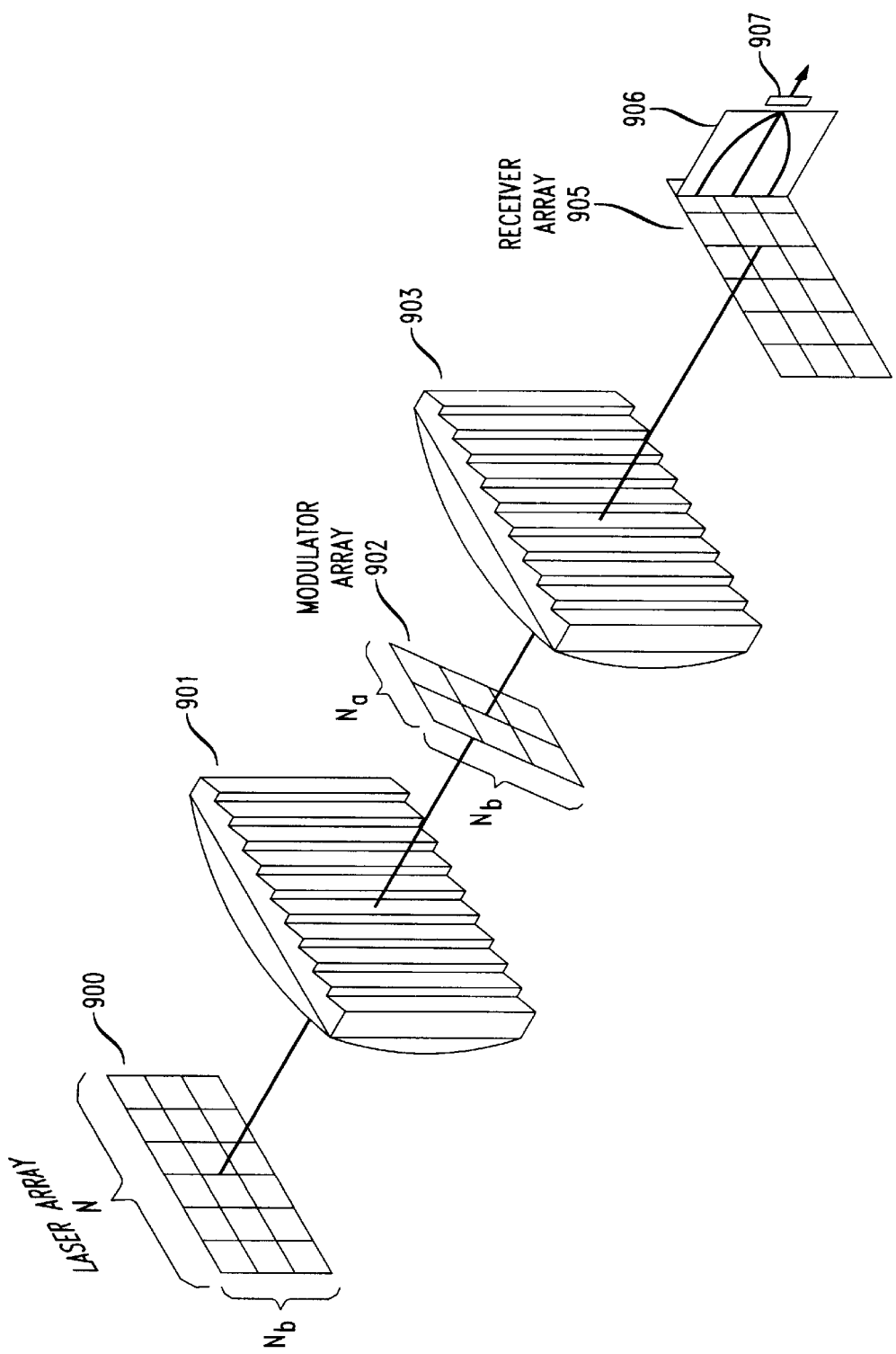

US 6,549,313 B1

BROADBAND ELECTRONIC N×N CROSS-CONNECT SWITCH USING TUNABLE LASERS

CROSS-REFERENCE TO RELATED APPLICATION

Related subject matter is disclosed in U.S. Pat. No. 6,359,912, Issued on Mar. 19, 2002, entitled "MULTIPLE WAVELENGTH LASER HAVING A REDUCED NUMBER OF WAVELENGTH CONTROLS" by the inventors, C. R. Doerr, C. P. Dragone, and A. M. Glass, which was concurrently filed with this application, both applications being assigned to the same Assignee.

TECHNICAL FIELD OF THE INVENTION

The present invention relates to Wavelength Division Multiplexed (WDM) systems and, more particularly, to the problem of realizing a broadband electronic cross-connect switch using multiwavelength lasers, broadband receivers and wavelength routers.

BACKGROUND OF THE INVENTION

Wavelength division multiplexing allows high transmission capacity by allowing many wavelengths to be simultaneously transmitted in each fiber. An important device that is then needed at each node is a broadband cross-connect switch providing complete connectivity between incoming and outgoing fibers. Here we assume that all incoming fibers are connected to suitable demultiplexers combined with broadband receivers providing electrical data to the switch. The switch is therefore connected between two sets of data lines, which carry the electrical signals corresponding to the various input and output wavelength channels. Channels must also be added and dropped, and therefore additional lines for these channels must be included. One would like if possible to use to an electronic switch for this purpose. However, for very high bit rates such as 10 Gbit/s, an electronic switch of large size is difficult to realize.

Thus, there is a continuing need for an electronic switch for handling a large number of very high bit rate channels.

SUMMARY OF THE INVENTION

In accordance with the present invention, we disclose a programmable broadband cross-connect switch which includes an N×N wavelength coupler combined with N tunable lasers, N modulators and N optical receivers. Each of the N tunable lasers can selectively produce N different wavelengths. The coupler couples the N wavelengths to the N modulators. The N modulators modulate the N wavelengths using N input electrical signals, each modulator being selectable by choosing a laser wavelength. The N optical receivers receive and detect the N modulated wavelengths to produce N output electrical signals therefrom, each receiver receiving and detecting a different one of the N different wavelengths. Thus, by selecting a laser wavelength a particular modulator and receiver pair is selected so that a modulated signal, formed at the selected modulator when an input electrical signal modulates the selected wavelength, is switched to the selected receiver. The switch exhibits improved efficiency, simplified lasers, and minimized fiber connections.

According to one aspect of the invention, the programmable broadband cross-connect switch can be arranged as an electronic data cross-bar switch and used to add and/or drop wavelengths from a wavelength division multiplexed signal. According to another aspect, the programmable broadband cross-connect switch can be arranged as a space-wavelength cross-connect which allows connectivity between any wavelength of an input fiber and wavelength of an output fiber.

In accordance with one feature of the invention the N×N coupler may be implemented as an N×N wavelength router or as a free-space grating. Another feature uses a concentrator for directing the laser signals to the grating. Yet another feature is that the N×N coupler and modulator is implemented using a plurality of units and where each coupler unit connects to a subset of the N modulators. A further feature is the use of a selectable laser having $N_a+N_b$ controls for producing $N_a N_b$ wavelengths.

BRIEF DESCRIPTION OF THE DRAWINGS

In the drawings,

FIG. 9a shows two conventional free-space gratings used for coupling optical signals between a laser array and a modulator array and between modular array and receiver array;

In the following description, identical element designations in different figures represent identical elements. Additionally in the element designations, the first digit refers to the figure in which that element is first located (e.g., 105 is first located in FIG. 1).

DETAILED DESCRIPTION

Figure 1:
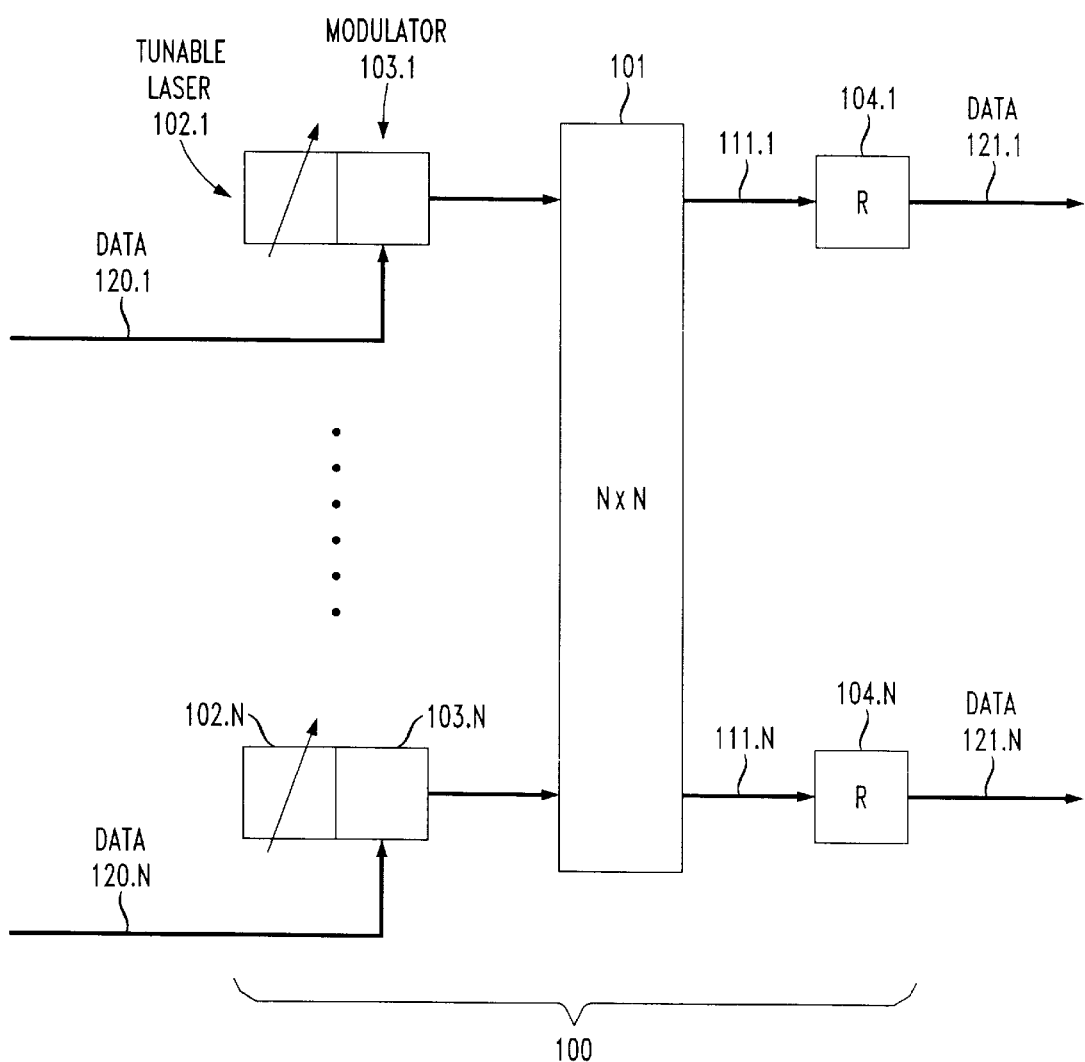
FIG. 1 shows, in accordance with the present invention, an illustrative block diagram of a first arrangement of our broadband cross-connect switch consisting of an N×N wavelength router combined with N tunable lasers, N modulators and N receivers.

In accordance with the present invention, we describe a N×N broadband cross-connect electronic switch for handling a large number of very high bit rate channels. With reference to FIG. 1, there is shown a block diagram of our broadband switch 100 consisting of an N×N router 101 combined with N tunable lasers 102, N modulators 103 and N broadband receivers 104. Each laser 102 is capable of producing M equally spaced wavelengths $\lambda_1, \ldots, \lambda_M$ (where M is initially assumed equal to N) and can be realized in integrated form by using the arrangement proposed in [1,2]. (In this specification, a reference to another document is designated by a number in brackets to identify its location in a list of references found in the Appendix) We assume that the wavelength spacing is small, for instance less than 100 GHz, and N is large, for instance more than 20. The N lasers 102 are connected, via N modulators 103, to the N input ports of an N×N router, which can be realized as in [3]. A unique property of this N×N router is that complete connectivity between any of the input and output ports is possible by only using N wavelengths $\lambda_1, \ldots, \lambda_N$. That is, by properly selecting the wavelength of any particular laser, e.g., 102.1, transmission to all output ports 111.1–111.N is possible without interference among different lasers, in the absence of aberrations. In particular, any wavelength received at a particular output port uniquely identifies the sending laser. There will be no interference, for a router without aberrations, because a wavelength simultaneously produced by different lasers 102.1–102.N is always transferred to different output ports 111.1–111.N.

Each modulator 103.1–103.N modulates its associated electrical data 110.1–110.N onto any wavelength produced by its associated laser 102.1–102.N. Then, by using N receivers 104.1–104.N, the input data supplied to a particular modulator can be transferred to any particular receiver, and thus transmitted to a particular output line 121.1–121.N. We have thus realized an electronic data cross-bar switch 100 consisting of a router 101 having N input data lines 120.1–120.N connected to N modulators 103.1–103.N, and N output lines 121.1–121.N connected to the N receivers 104.1–104.N.

Notice that the number of input (or output) lines that are used at any given time during normal operation will be generally less than N, to allow the remaining lines to be used as spares. Also notice, if each laser 102 is simply realized by using an N×1 router as in [2], then N controls are needed and such laser may be difficult to realize in integrated form for large N. It may then be desirable to reduce the number of controls, for instance by a factor P, by including temperature tuning of the lasers. Thus by dividing the above set of N wavelengths into Q groups, each consisting of a comb of P wavelengths, one obtains the set of wavelengths $\lambda_{i,r}$, with $i=1, \ldots, P$ and $r=1, \ldots, Q$ where $\lambda_{i,r}$ is the r-th wavelength of the i-th group. Now P controls are needed to change i, and the value of r can be changed by temperature tuning. Therefore, each laser 102 can be realized by using a P×1 router with P controls. Each laser is capable, at any particular temperature, of P equally spaced wavelengths, each belonging to a particular comb. Moreover, for any control choice, any of the Q wavelengths for $r=1, \ldots, Q$ can be produced by temperature tuning. In this manner P×Q=N different wavelengths are produced by each laser 102. However, temperature tuning is typically slow and only small values of Q can be realized realistically. Therefore, we also describe a technique (FIG. 7) that reduces the number of Q controls by including several output ports in each laser.

The electronic data cross-bar switch 100 should also include monitoring. To this purpose, monitoring of each received wavelength can be realized by including in the router 101 additional monitoring ports as shown for instance in [4] or by using similar techniques. Notice in order to control the power levels and the wavelengths of the lasers, an electronic crossbar switch must be connected, in a well known manner, between the receivers and the lasers, so that suitable corrections can be applied to the lasers.

Figure 12:
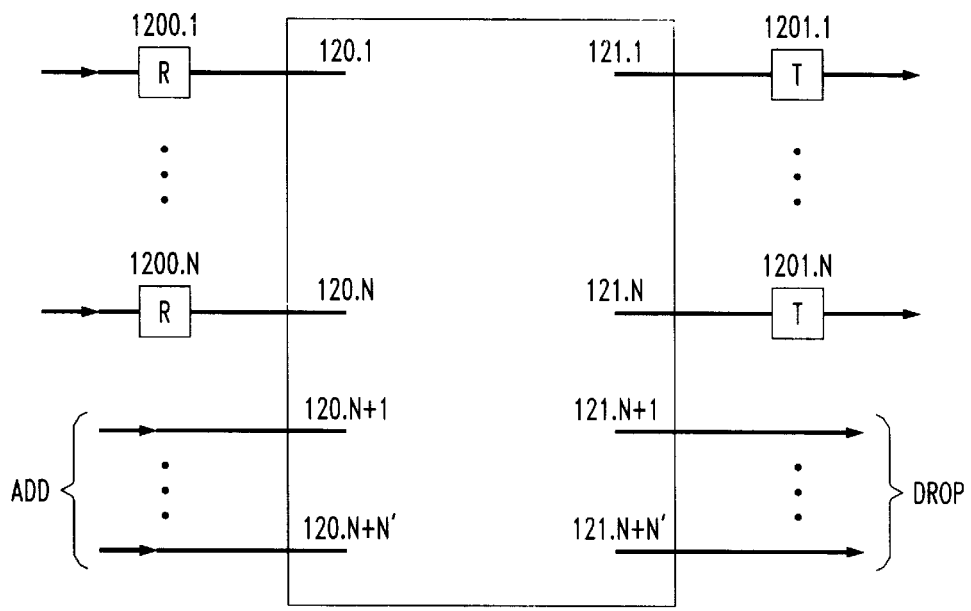
FIG. 12, shows an application of FIG. 1 as part of a programmable add/drop filter.

With reference to FIG. 12, there is shown an application of our electronic data cross-bar switch 100 used for the realization of a programmable channel adding/dropping filter, which can be implemented by combining the switch 100 with input optical receivers 1200.1–1200.N and output optical transmitters 1201.1–1201.N, respectively receiving N incoming optical signals of arbitrary wavelengths, and transmitting N output signals of appropriate wavelengths. In such an arrangement, each of the wavelengths to be dropped would be outputted as electronic data signals at output ports, e.g., 121.N+1 through 121.N+N', of the electronic data cross-bar switch 100. Similarly, each of the wavelengths to be added would be inputted as electronic data signals at input ports, e.g., 120.N+1 through 120.N+N', of the electronic data cross-bar switch 100. Obviously the number of add or drop ports N, can be any number up to and equal to the number of input signals N.

Figure 13:
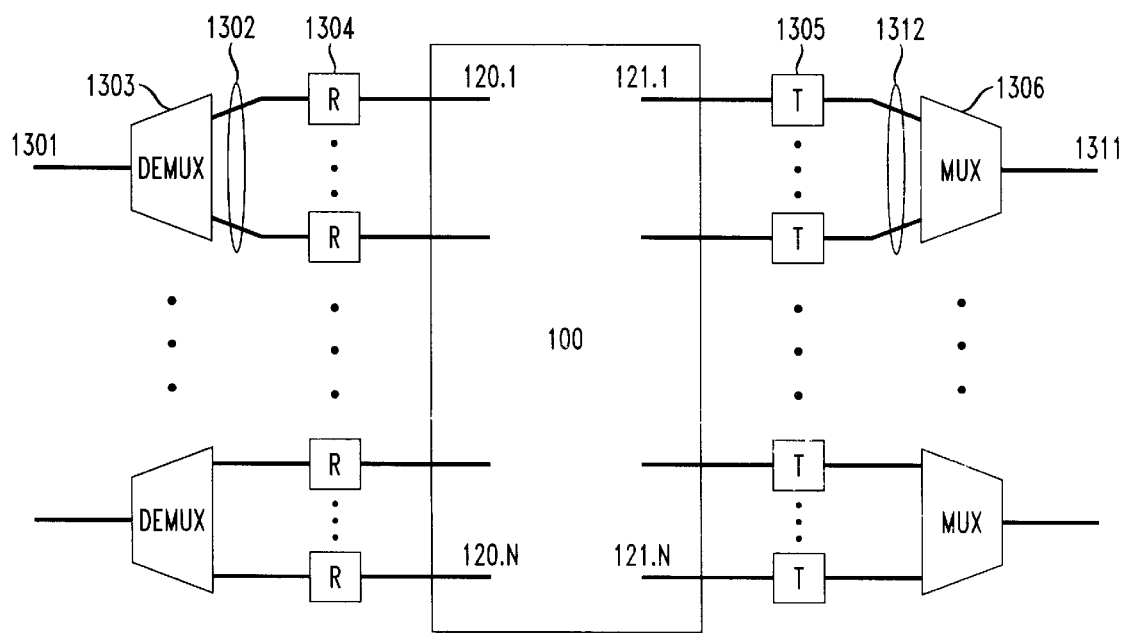
FIG. 13 shows an application of FIG. 1 as a generalized space-wavelength cross-connect which allows connectivity between any input fiber and wavelength thereof, and any output fiber and wavelength thereof.

Another application, shown in FIG. 13, is a generalized space-wavelength cross-connect which allows connectivity between any input fiber 1301 and wavelength 1302, and any output fiber 1311 and wavelength 1312. This application is realized with suitable input demultiplexers 1303 and optical to receivers 1304 and optical output transmitters 1305 and multiplexers 1306. Obviously the add and drop port capability of FIG. 12 can also be added to FIG. 13.

Returning to FIG. 1, the broadband electronic N×N Cross-Connect switch may be practically implemented using any of a variety of N×N router 101 designs and/or the laser unit 102 designs. An important feature of the N×N router 101 is that each input wavelength can be changed by an integer multiple of its period (the free-spectral range) without affecting the corresponding transmission coefficient (to a good approximation). Therefore each of the N lasers 102 can have different sets of wavelengths, provided they can be reduced to the same set by adding to each wavelength a suitable multiple of the period. A variety of different choices are therefore available for the wavelengths of each laser, and this added flexibility can be advantageous to simplify the laser design, e.g., by reducing the number of lasers needed.

Figure 4:
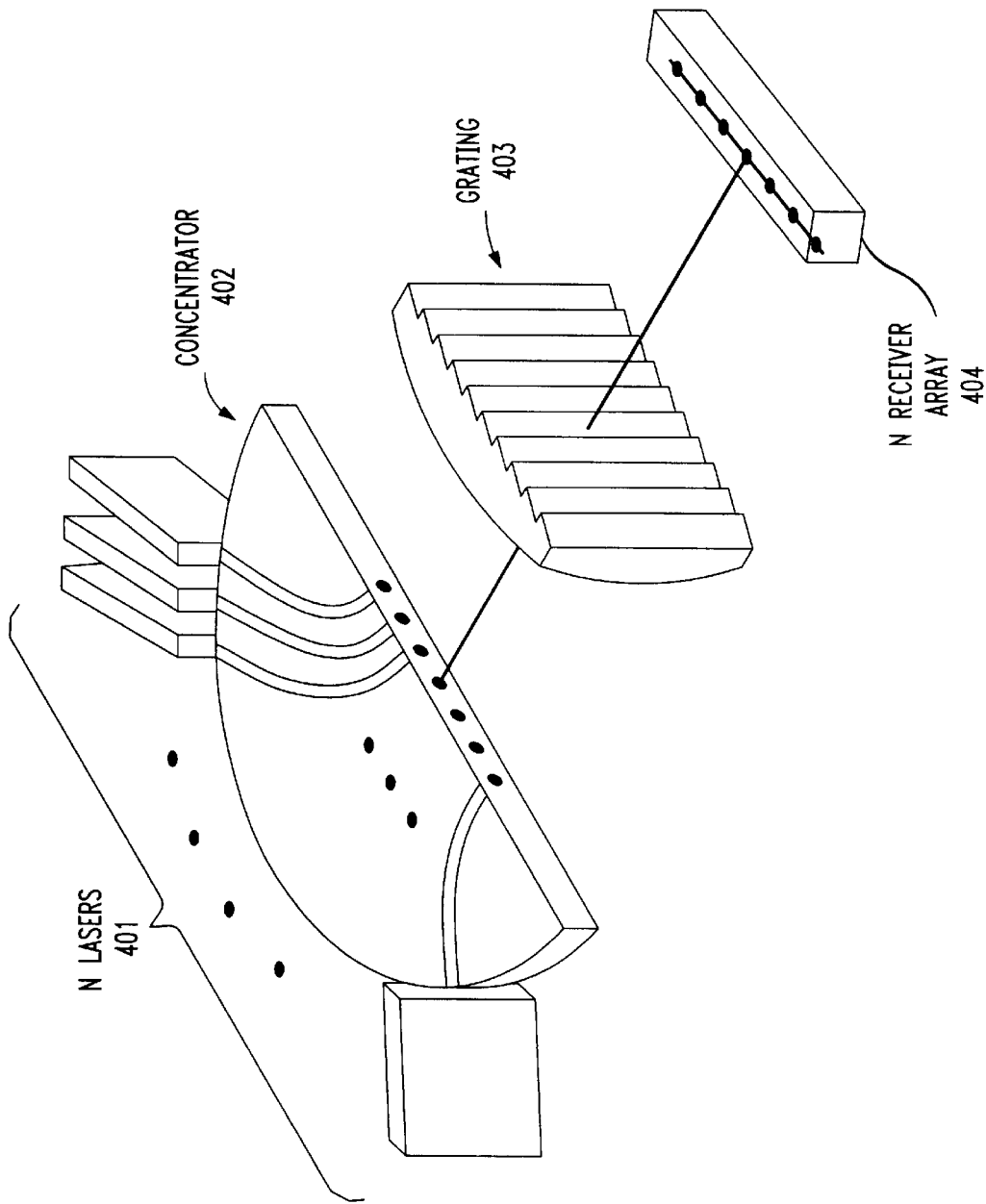
FIG. 4 shows N laser transmitters directly connected to a concentrator consisting of an array of N silica waveguides formed on a silicon wafer. The transmitters are widely separated, and the concentrator is needed to reduce their spacing, so as to form an array of closely spaced radiating apertures. A conventional grating is used to send each transmitted wavelength to a receiving array, connected to the receiving receivers.

On the other hand, an N×N router 101 having very large values of N may be simpler to realize by using, instead of a periodic router (FIG. 2), a conventional imaging arrangement including a conventional grating as shown in FIG. 4. In this case however, the N combs produced by the N lasers must be equally displaced from each other, as required by the grating angular dispersion and the spacing of the periodic array formed by the N lasers. As shown in FIG. 4, this conventional imaging arrangement includes N lasers/modulator units 401, a concentrator 402 to align the laser wavelengths for coupling to a conventional grating 403, and an array of N receivers 404. The receivers may be combined with a concentrator as was shown with the laser.

Finally, as pointed out earlier, it is generally desirable to simplify the laser design by reducing the number of controls. Thus we also consider a simpler laser design of FIGS. 5 and 6, which requires however a more complicated fabric, FIG. 7. As will be discussed in more detail in a later paragraph, the simplified laser design of FIGS. 5 and 6 includes $N_b$ ports, but the number of wavelengths from each port is reduced to $N_a = N/N_b$, and only $N_a + N_b$ controls are required. The tunable lasers of FIGS. 5 and 6 having a reduced number of controls are similar to the tunable laser described in the article entitled "Arrayed-Waveguide grating lasers and their applications to tuning-free wavelength routing" by Y. Tachikawa et al, IEE Proc. -Optoelectron., Vol 143, No. 5, pp. 322–328, October 1996.

Router Design

Figure 2:
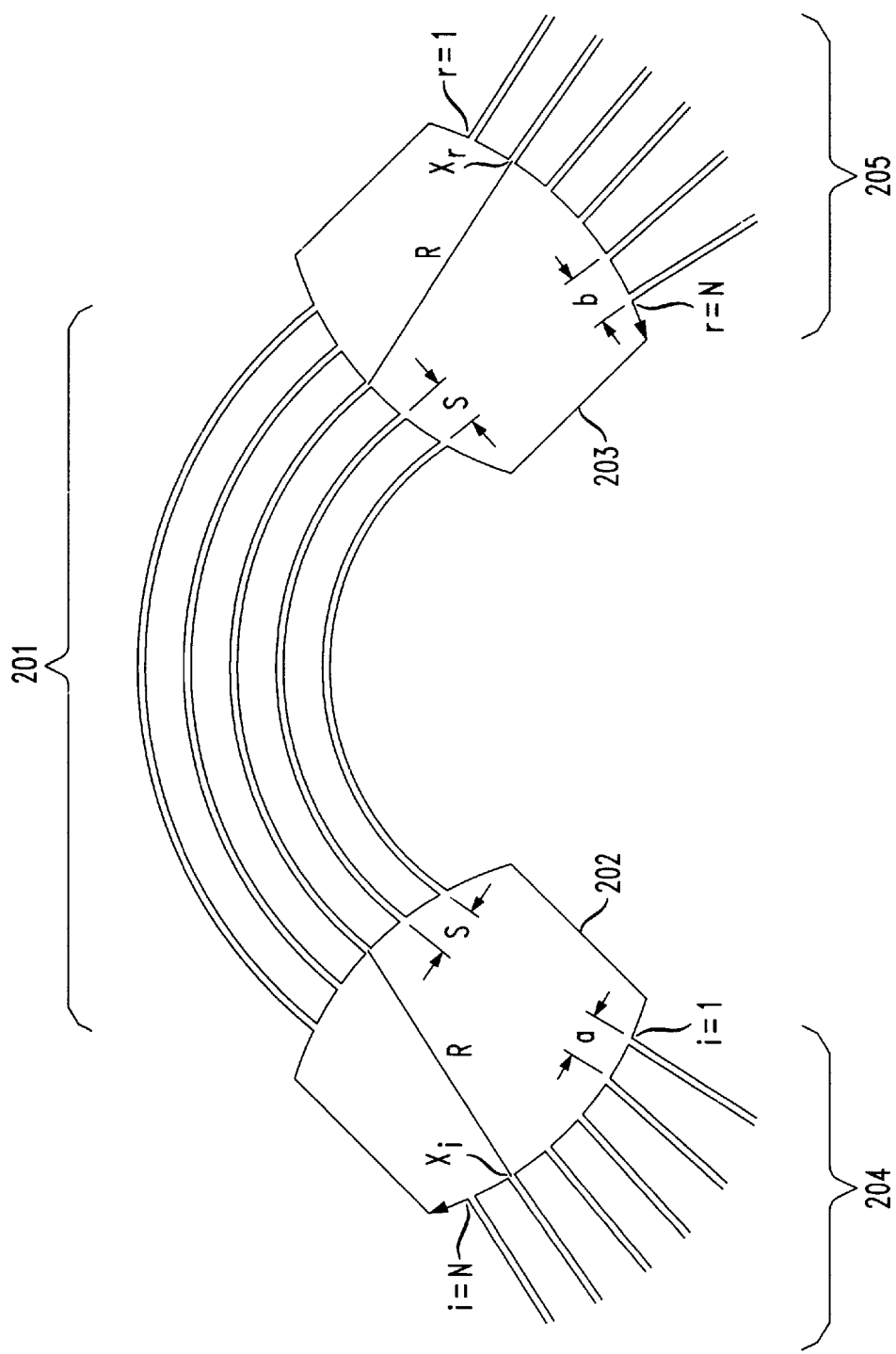
FIG. 2 shows a waveguide grating router consisting of a waveguide grating between two free-space regions. The input and output waveguides are spaced by a and b along the input and output boundaries of the router.

The router 101 in FIG. 1 can be realized in integrated form as shown in FIG. 2 by using an imaging arrangement of waveguides (arms) or grating 201 having a constant path-length difference. The grating 201 is placed between two dielectric slabs forming two planar free-space regions 202 and 203 on a substrate. The input 204 and output 205 waveguides are connected to the input and output boundaries of the two free-space regions 202 and 203, respectively. In a conventional router each transmission coefficient between two particular ports has essentially periodic behavior characterized by equally spaced peaks, and each peak is produced by a particular order m of the grating. For instance, the wavelengths of maximum transmission from the i-th input waveguide, $x_i$, to the output r-th waveguide, $x_r$, are specified by the relation $$\frac{x_i - x_r}{R} = \frac{m\lambda - m_0\lambda_0}{S} \quad (1)$$

where $x_i$, $x_r$ are the coordinates specifying the locations of the two waveguides, m is the order of the grating, S is the spacing of the receiving and transmitting ends of the arms, $m_0$ is a particular value of m, $\lambda_0$ is a particular design wavelength, R is the radial distance of the input waveguides from the central arm of the grating, and the same distance R is assumed between the central arm and the output waveguides. In the above expression we can write $$m\lambda - m_0\lambda_0 = (m-m_0)\lambda_0 + m_0(\lambda-\lambda_0) + (m-m_0)(\lambda-\lambda_0) \quad (2)$$

where the last term can be neglected if either $\lambda - \lambda_0$ or $m - m_0$ is small. We initially let the spacing a of the input waveguides be equal to the spacing b of the output waveguides and choose $$a = b = \frac{1}{N}\frac{R\lambda_0}{S} \quad (3)$$

Then neglecting the last term of (2) and letting $$x_a = ia, \; x_b = rb, \quad (4)$$

we find from (1) that the wavelengths of maximum transmission from input port i to output port r are approximately given by $$\lambda_{i,r} \simeq \lambda_0 + \left[\frac{i-r}{N} - (m-m_0)\right]\frac{\lambda}{m_0} \quad (5)$$

where i, r=1, . . . , N and m is an integer close to $m_0$. We have thus obtained a set of equally spaced wavelengths. We choose from this set a subset of N consecutive wavelengths and let them coincide with the N wavelengths $$\lambda_1, \lambda_2, \ldots, \lambda_N \quad (6)$$

produced by each laser in FIG. 1. We can then verify that each pair of ports i,r now has a peak of transmission at one of the above wavelengths. It is generally convenient to design the router so that a particular input port has the property that the entire set is produced by the order $m_0$. However, then none of the other input ports has this property. That is, some of the wavelengths of the above set, instead of being produced by $m_0$, are produced by the next lower or higher order. This is an important limitation since we have derived expression (5) using the approximation $$m\lambda - m_0\lambda_0 \simeq (m-m_0)\lambda_0 + m_0(\lambda-\lambda_0) \quad (7)$$

which for m different from $m_0$ is only satisfied if the interval covered by the wavelengths $\lambda_1, \ldots, \lambda_N$ is much smaller than $\lambda_0$. As a consequence one finds that values of N exceeding about 50 are difficult to realize for bit rates exceeding about 30 Gb/sec.

Figure 3:
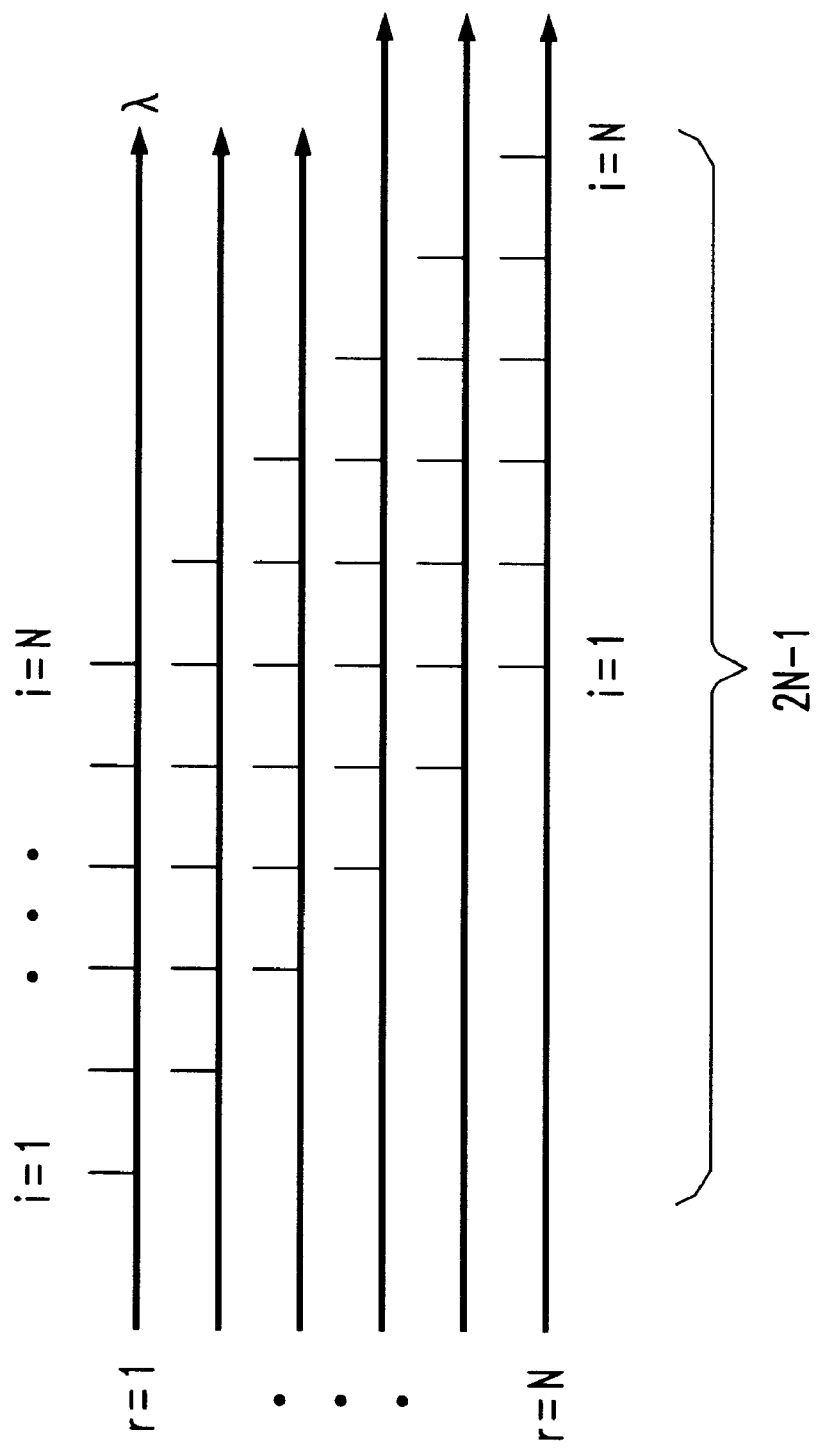
FIG. 3 shows the wavelengths of maximum transmission produced by a particular order of a conventional N×N router when the input and output waveguides are equally spaced by a=b along the input and output boundaries of the two free-space regions.

On the other hand, the above limitation only arises if we require that full connectivity be produced with the minimum number N of wavelengths. By removing this condition and choosing $m = m_0$ we obtain from Eq. (1)

$$\lambda_{i,r} \simeq \lambda_0 + (i-r)w, \quad (8)$$

where w denotes the wavelength spacing. This relation now applies for all i,r. However, by letting i,r=1, . . . , N a total of 2N−1 wavelengths is now required instead of only N, as shown in FIG. 3. Thus, the arrangement is more difficult to design, since the lasers must now produce N different combs of wavelengths, and the total number of wavelengths is increased. On the other hand, an advantage of the above 2N−1 wavelengths is that they allow the router to be realized for large N by using a conventional grating 403 of low order $m_0$, as shown in FIG. 4. This arrangement may be advantageous for large N since a limitation of the waveguide grating of FIG. 2 is its size, which for large N becomes too large for integration on a single wafer. To summarize, the arrangement of FIG. I is the best design, provided N is not too large, in which case it must be replaced by a different arrangement (e.g., FIG. 7) possibly involving lasers with different combs of wavelengths.

Laser Design

Figure 5:
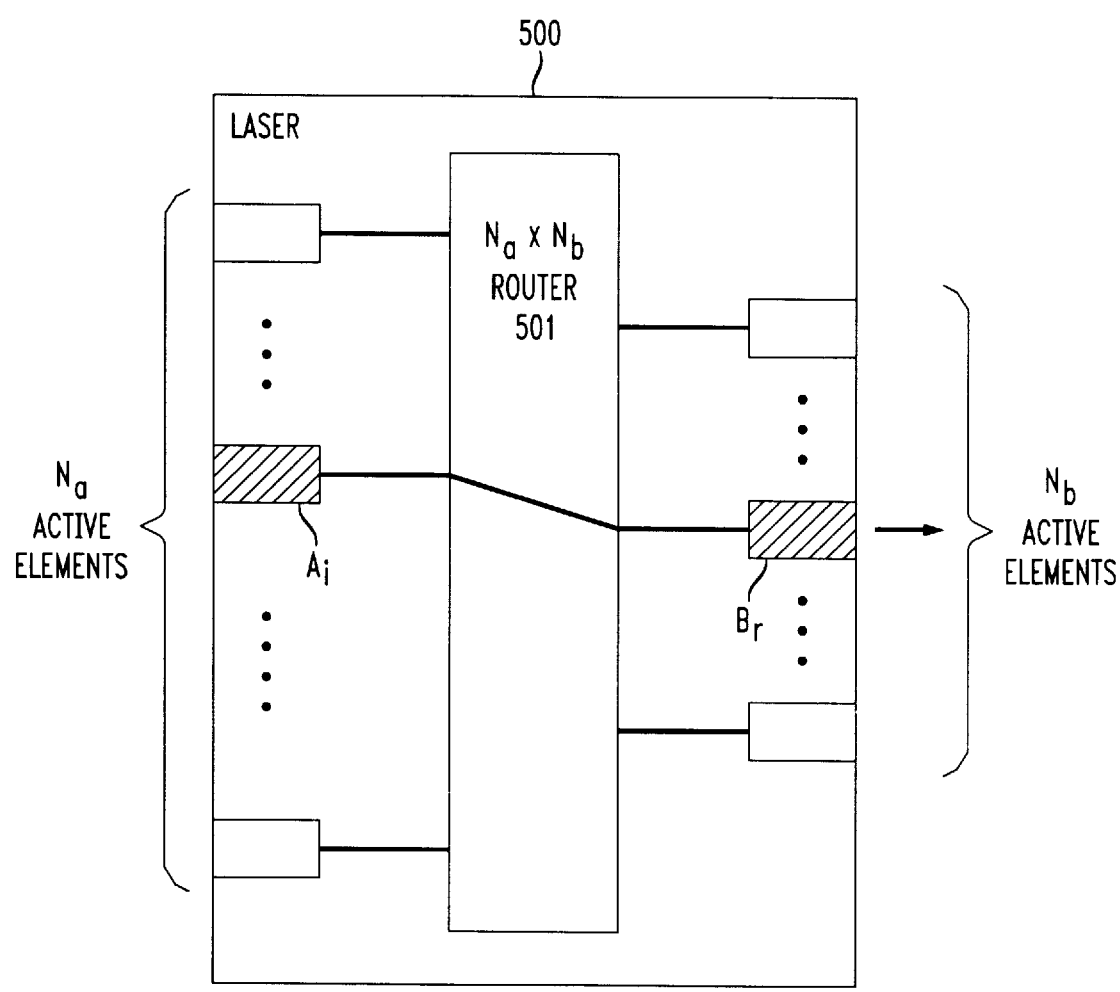
FIG. 5 shows an illustration of a laser used in FIG. 4 implemented using an $N_a \times N_b$ router combined with $N_a+N_b$ control elements.
Figure 6A:
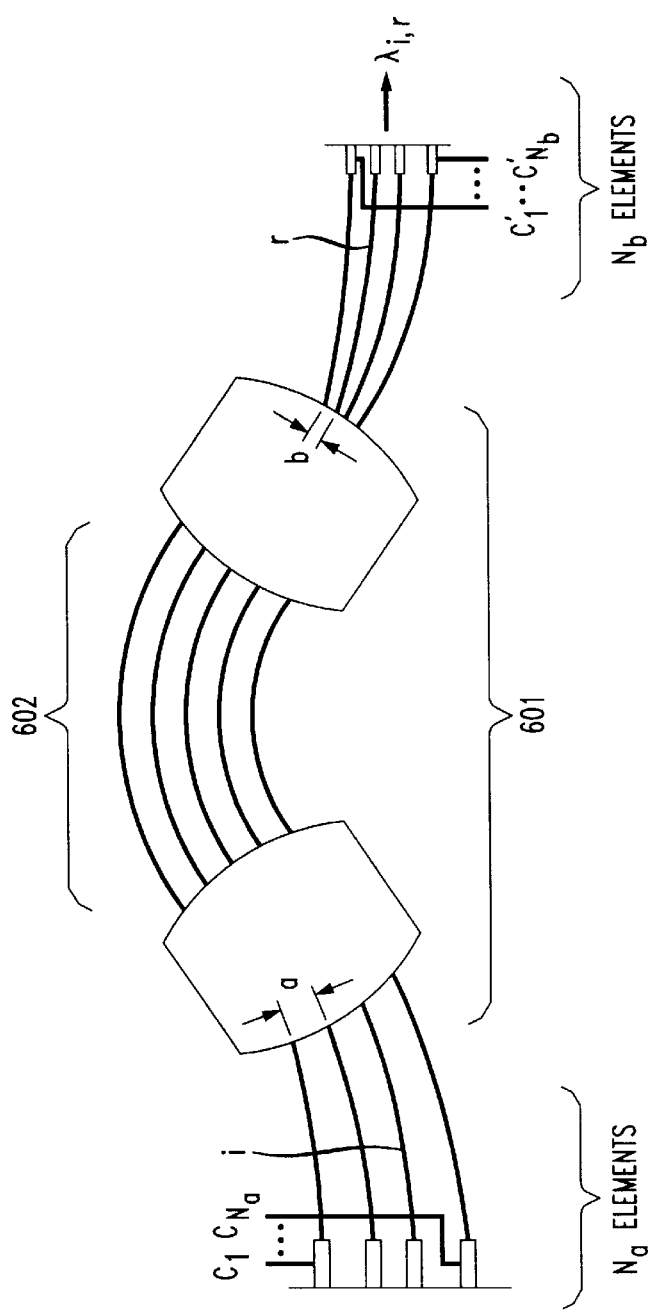
FIG. 6a shows a more detailed implementation of the laser of FIG. 5 realized by including suitable reflections in the input and output waveguides of a waveguide grating router. Each reflection is produced by an active element whose gain or loss can be controlled electronically via a control lead. Shown in FIG. 6b are the wavelengths produced by a particular order $m_0$ when the spacing b of the output waveguides satisfies $b=a/N_b$.

With reference to FIG. 5, consider a laser 500 consisting of an $N_a \times N_b$ router 501 combined with $N_a + N_b$ active elements. The router 501 can be realized using the waveguide grating router 601 as shown in FIG. 6a and, by choosing $N_a=N_b$, the laser can be designed so that the same $N_a$ wavelengths can be produced by each of the output ports. In the special case of FIG. 1, on the other hand, only one output port is needed. We next discuss the general case $N_a \neq N_b$ and assume for simplicity that all wavelengths of interest are produced by a particular order $m_0$ of the grating.

Each element of $N_a$ and $N_b$ in FIG. 6a can be viewed as a reflective termination connected to a particular port of the router 601. Each element of $N_a$ and $N_b$ consists of a reflector combined with a waveguide section having variable gain (or loss) that can be controlled electrically, via control leads $C_1-C_{Na}$ and $C'_1-C'_{Nb}$. By activating two particular elements, via their control leads, on opposite sides of the router, a cavity including the router 601 is formed and, by providing sufficient gain, lasing will generally occur at the strongest resonance, typically the one of highest gain. Notice, for the application considered here each laser is only required to produce one wavelength at the time. Therefore in each case, in order to produce a particular wavelength, only two elements (one of $N_a$ and one of $N_b$) are activated while all other elements are set at maximum loss.

Figure 6B:
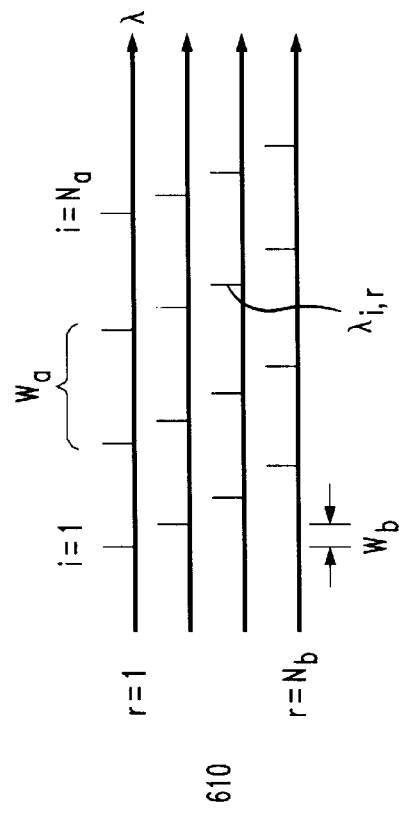

In a conventional router specified by Eq. (5), the waveguides are equally spaced with the same input and output spacing and the same comb of wavelengths are produced from all ports as discussed earlier. Here, however, it is generally convenient to produce from the various output ports of the laser different combs as illustrated by 610 in FIG. 6a. Shown by FIG. 6b are the wavelengths produced by a particular order $m_0$ when the spacing b of the output waveguides satisfies $b=a/N_b$.

For a conventional router, each transmission coefficient between two particular ports has essentially periodic behavior characterized by equally spaced peaks. Here, instead, it is desirable to design the router as in [2] so that one of the above peaks has amplitude appreciably larger than the others. This condition can be satisfied by designing the grating 602 with a quadratic path length variation included in the arms so as to cause the grating focal length to exhibit a strong variation as a function of the wavelength. One can insure by this technique that the peak of largest amplitude is always the one corresponding to a particular order $m_0$ of the grating. Here we assume this condition and let the locations of the input and output waveguides along boundaries of the router free-space regions be equally spaced by a and b, respectively, as shown in FIG. 6a. Then, the wavelength $\lambda_{i,r}$ produced for $m=m_0$ by activating two particular active elements i,r can be written $$\lambda_{i,r}=\lambda_0+(i-i_0)w_a-(r-r_0)w_b$$

where $i_0$, $r_0$ are two particular values of i,r, corresponding to the wavelength $\lambda_0=\lambda_{i_0 r_0}$ and $w_a$, $w_b$ are determined by the input and output spacings a, b.

$$w_a/w_b=a/b.$$

As a result, by choosing $$a/b=N_b$$

we obtain the set of equally spaced wavelengths, consisting of $N_b$ interleaved combs, each produced by a particular port. As shown in FIG. 6b, each comb consists of $N_a$ wavelengths spaced by $w_a$, and each comb is displaced from the other combs by multiples of $w_b=w_a/N_b$. The i-th wavelength $\lambda_{i,r}$ of the r-th comb is produced by activating the elements $A_i$ and $B_r$ (see FIG. 5). Here we assume that $B_r$ is partially transmitting, so that power at that wavelength can be partially transmitted to a suitable output waveguide. Notice the above laser implementation concept illustrated in FIGS. 5, 6 effectively reduces the number of laser controls by a factor $(N_a+N_b)/N_aN_b$ and this concept can be combined with the temperature tuning concept to further reduce the number of controls or, equivalently, to increase the number of wavelength channels N for a given number of controls.

A disadvantage of the above laser arrangement is that each laser now has $N_b$ ports, and therefore for N lasers the total number of ports is increased by a factor $N_b$. Therefore, the lasers cannot be directly connected to the modulators as in FIG. 1. Instead, we must use a relatively large router, with $N_bN$ input ports, which is advantageously realized by using $N_b$ smaller routers as shown in FIG. 7. It is convenient to use a similar arrangement between the modulators and receivers, in which case now each receiver must also have $N_b$ ports. The new arrangement shown in FIG. 7 represents another embodiment of our broadband electronic N×N cross-connect switch. Notice in FIG. 7, the value is illustratively equal to 6, $N_a=2$ and $N_b=3$. Each of the N lasers has a control signal, C1–C6, which selects which of the N wavelengths is to be generated by that laser. Since each laser now has $N_b=3$ ports, the lasers cannot be directly connected to the N=6 modulators as in FIG. 1. Instead, we use an arrangement of $N_b$ routers each with an N×$N_a$ (6 by 2) structure, where each of the N=6 inputs connect to a different one of the N lasers. Each of the $N_b$ routers has $N_a=2$ outputs, so that together the routers have $N=N_aN_b=6$ outputs to connect to the N=6 modulators. In this manner by selecting a laser's control, the port and wavelength at that port are selected, each of the N lasers can be connected to any of the N modulators. Each of the N modulators are modulated using an input data signal I1–I6. An identical arrangement of $N_b$ routers is used to connect the N modulators to N receivers. Notice also that each receiver has $N_b$ input ports.

Our illustrative electronic N×N cross-connect switch of FIG. 7 is an imaging arrangement that provides a one-to-one mapping between N lasers and N receivers. Each receiver only receives (ignoring crosstalk) the wavelengths produced by a particular laser. On the other hand, the path from each laser to the corresponding receiver varies depending on the laser control and, by properly choosing the laser control, anyone of the N modulators can be selected. We have thus constructed a switch in which an input signal, e.g., I3, applied to a particular modulator can be transferred to the appropriate receiver by properly selecting the laser control corresponding to that receiver. Thus, for example, we assume that receiver 708 can only receive the wavelengths from laser 701. By selecting the appropriate control for laser 701, using control signal C1, enables router 703 to receive the wavelength over path 704 and to couple it to modulator 705. At modulator 705, input electrical data signal 3 modulates the selected wavelength and the modulated signal is then routed by router 706 over path 707 to receiver 708. Thus, by selecting a wavelength and a port at one of the N lasers, an input data signal, e.g., I3, at a modulator, i.e., 705, selected by that wavelength can be switched to a receiver, i.e., 708, selected to receive that wavelength. At the receiver, the selected demodulated output electrical data signal, e.g., O1, is outputted. In this manner, the selection of wavelength enables any of the input signals I1–I6 to be switched to any of the electrical outputs O1–O6.

It should be noted that in the special case $w_b=0$, one can replace the $N_b$ routers shown in FIG. 7 between the modulators and the receivers by a periodic N×N router as in FIG.

1, in which case only one port is required for each receiver. However, the laser design in this case is more difficult, since its wavelengths are not all produced by the same order $m_0$ as in [2].

Figure 7A:
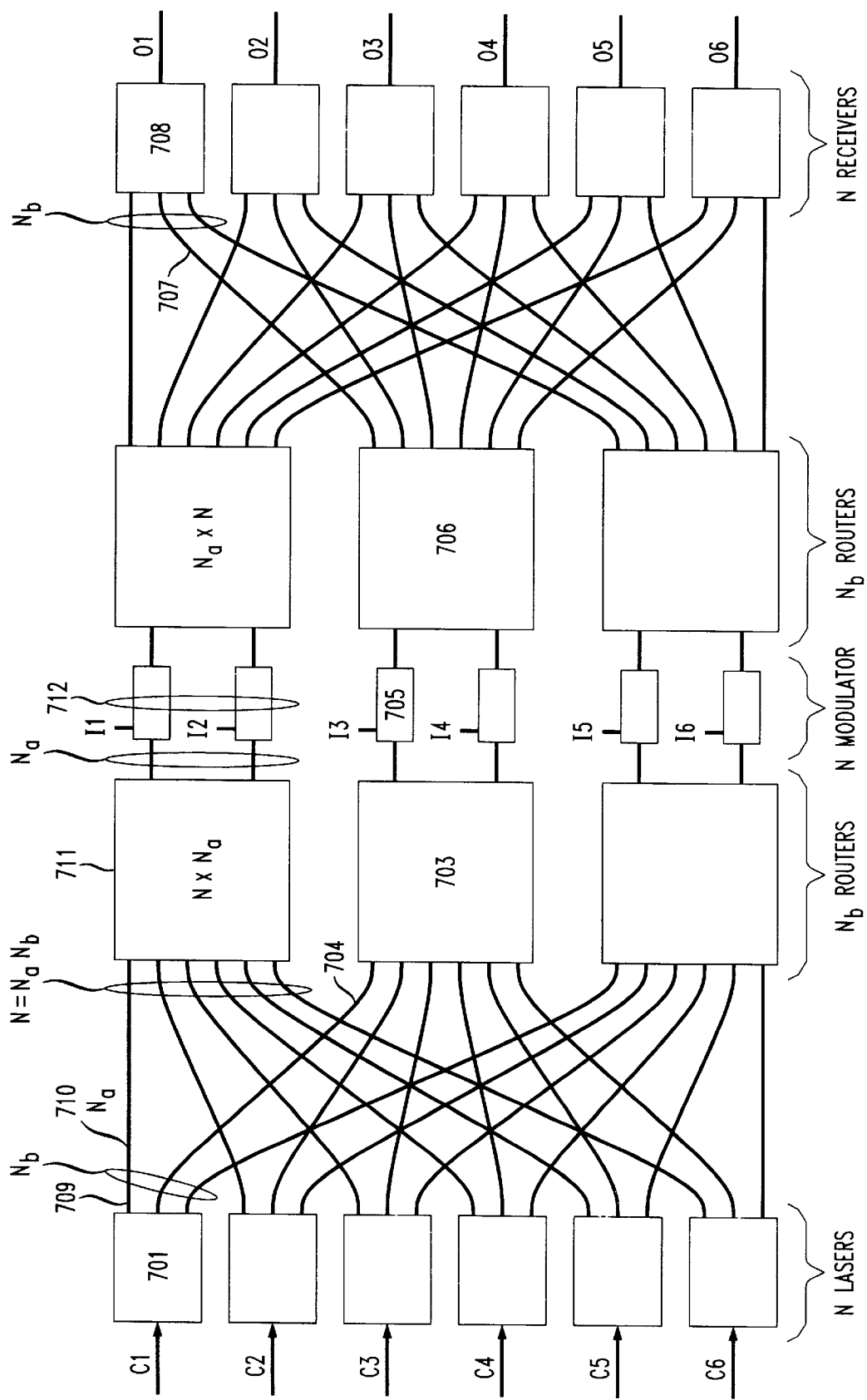
FIG. 7a shows an alternative embodiment of the broadband cross-connect switch of FIG. 1 including N lasers, N modulators, and N receivers.

Notice the input and output wavelengths for each $N \times N_a$ router are arranged as prescribed by Eq. (8), and illustrated in FIG. 8. Thus, each of the $N_a$ wavelengths produced by a particular laser is transferred to one of the $N_a$ modulators connected to the router. For example as shown in FIG. 7, each of the $N_a$=2 wavelengths produced by laser 701 at port 709 is transferred over path 710 to router 711 and connects to one of the $N_a$=2 modulators 712.

Figure 7B:
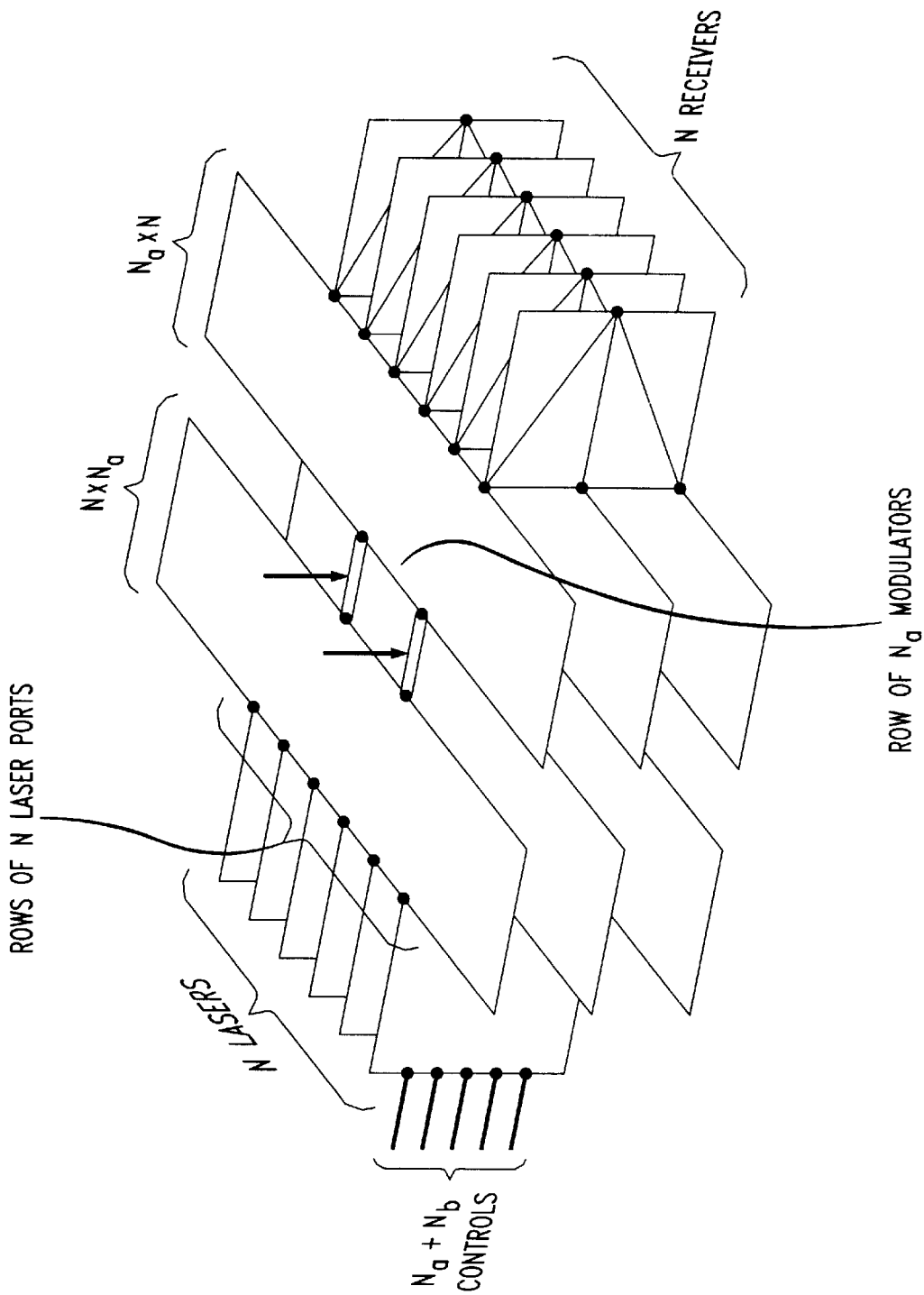
FIG. 7b shows the construction of the arrangement of FIG. 7a in $N_b$ layers.
Figure 8:
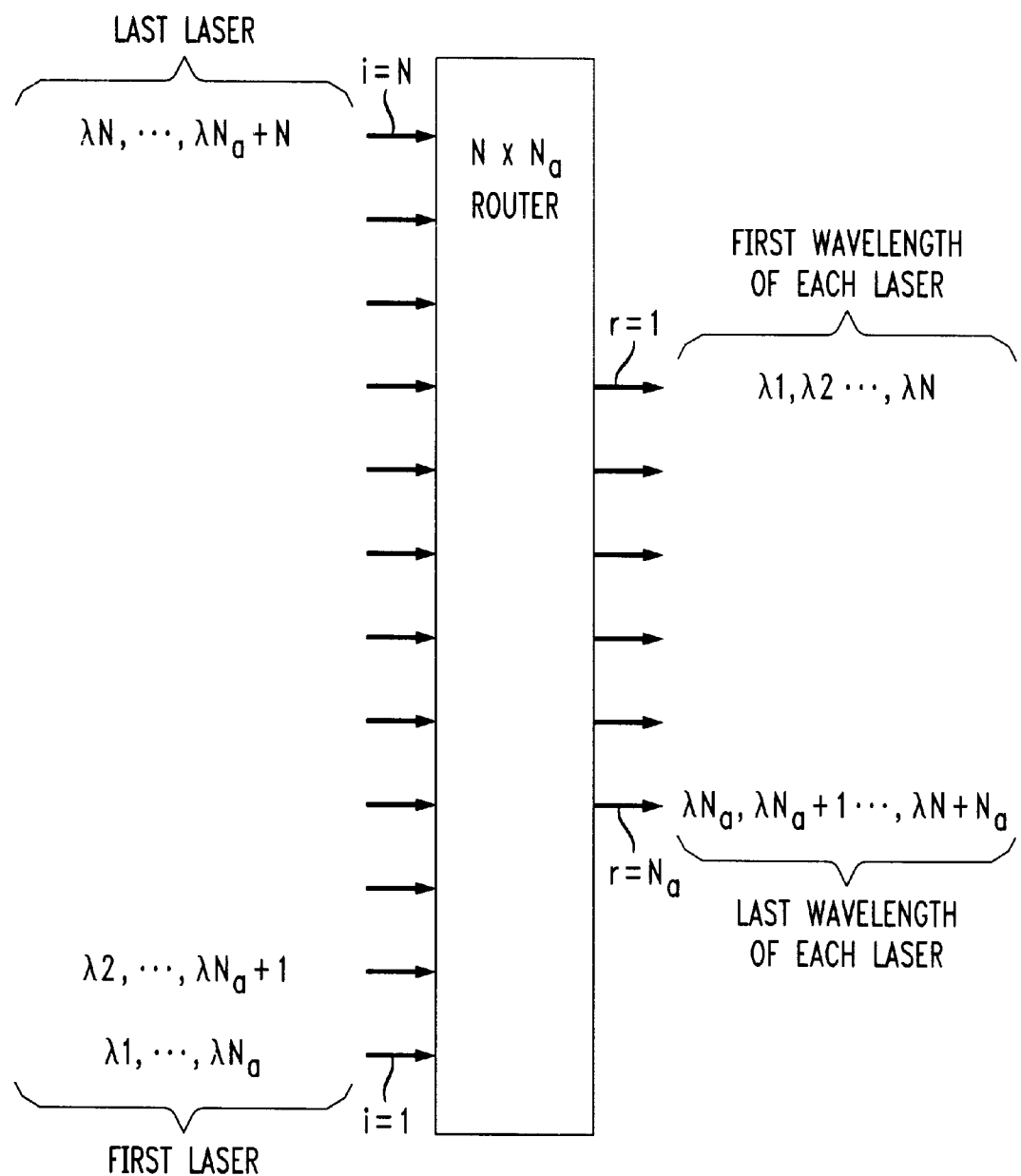
FIG. 8 shows an illustrative $N \times N_a$ router for coupling corresponding rows of N lasers to the $N_a$ modulators.

Notice, by arranging the $N_b$ routers between the lasers and the modulators, or between the modulators and the receivers, on parallel layers we obtain the representation of FIG. 7b. The various ports of the lasers then form a rectangular array, and the same is true for the modulators and the receivers. Each array has exactly $N_b$ rows and each row is connected to a particular row of the modulators. Similarly, each row of the modulators is connected to a particular row of receiver ports. Each layer is similar to the arrangement of FIG. 1, except that now the number of modulators on each layer is reduced by a factor $N_b$. As a consequence, each router is now simpler to realize, since it is smaller than the router in FIG. 1.

Figure 9B:
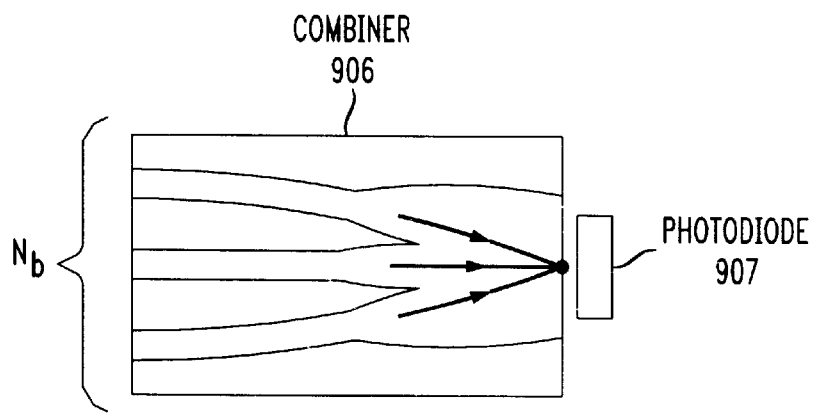
FIG. 9b shows a side view of the coupling of signals in a particular receiver consisting of a combiner and a photodiode.
Figure 10A:
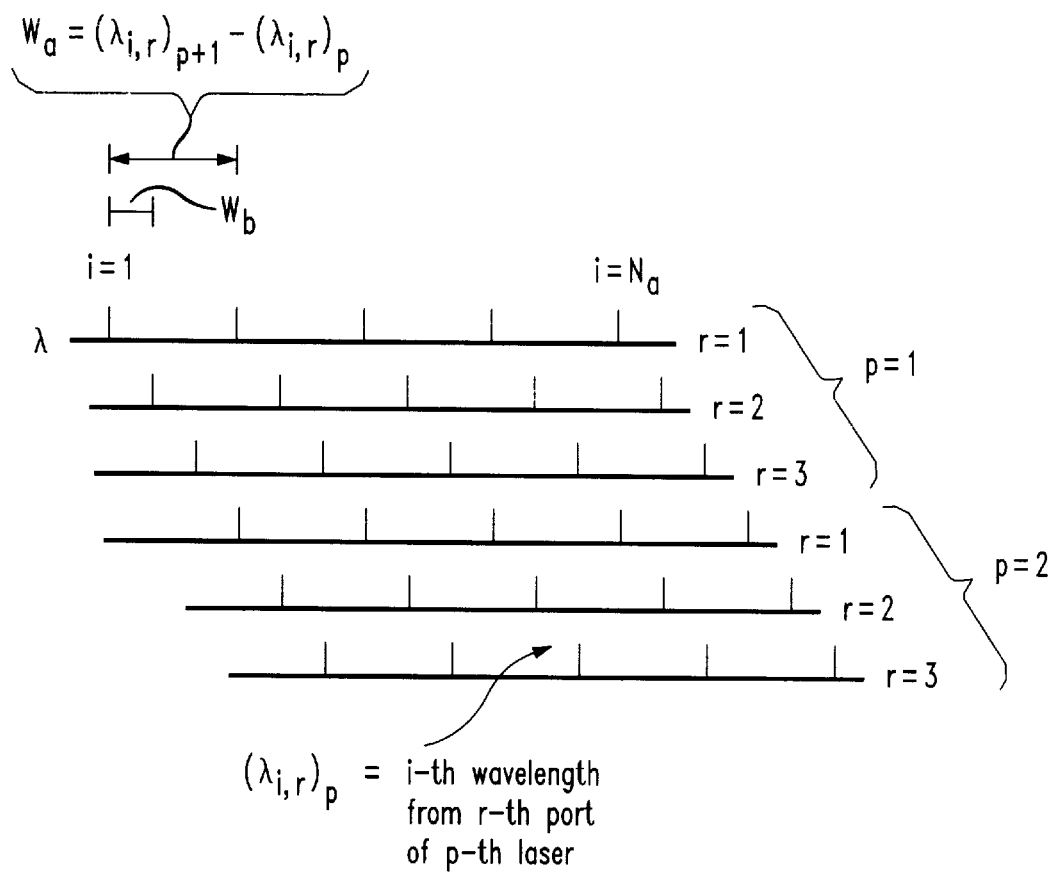
FIG. 10a shows the combs of wavelengths produced by the N lasers.
Figure 10B:
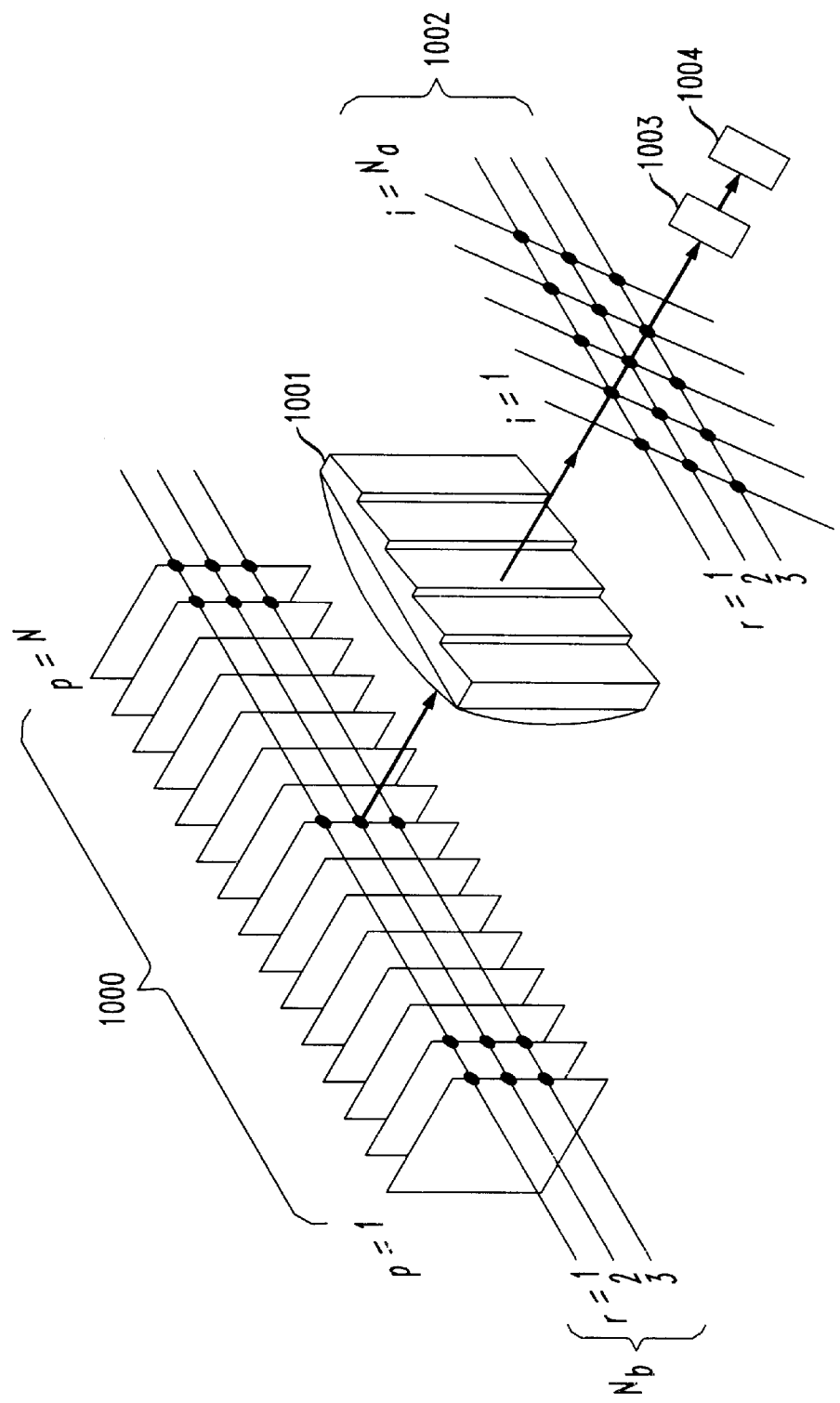
FIG. 10b shows the use of a single free-space grating to direct signals from the lasers to the modulators.

Indeed, the entire set of routers between the lasers and modulators can be realized by using a single free-space grating, and the same is true for the routers between the modulators and receivers, as shown in FIG. 9a. Notice, that each path from a particular laser in FIG. 7b remains on one layer and, since the arrangement is symmetric, the receiver receiving a particular path is independent of the laser wavelength. That is, each laser always transmits to the same receiver. As shown in FIG. 9a, the outputs of the N lasers are arranged in a rectangular laser array, 900 (In the manner shown in FIG. 11), and their wavelengths are chosen as in FIG. 8 so that complete connectivity between the lasers 900 and the modulator array 902 can be realized by using a conventional grating 901. FIG. 10b illustratively shows the source arrangement in greater detail, where the N lasers with $N_b$ outputs from a rectangular array 1000 which single grating 1001 routes to modulator array 1002. FIG. 10a shows the generalized assignment of wavelengths for each laser as $(\lambda_{i, r})_p$, where the variable "p" identifies the laser, "r" is the laser port, and "i" is the wavelength at each port. The wavelength separation for wavelengths on the same port is $w_a$, and the wavelength separation between wavelengths of adjacent ports is $w_b$.

Figure 9C:
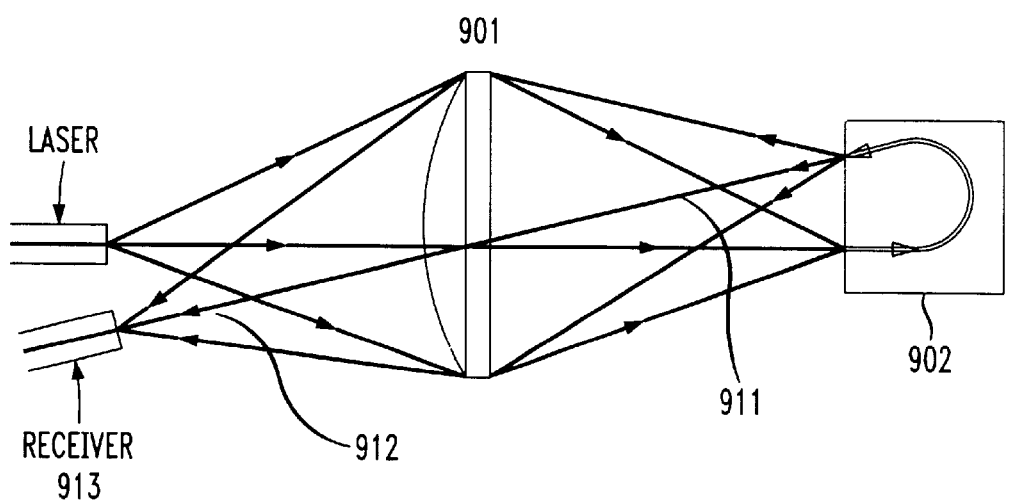
FIG. 9c shows a schematic representation of folded arrangement using a reflective modulator. Notice the transmissive grating can be replaced by a reflective grating.

In a similar way, a single grating 903 arranged in a mirror image of that shown as 901 is needed in FIG. 9a (and 10b) in order to couple the signals 903 (1003) between the modulators 902 (1002) and the receivers 905 (1005). Therefore, the complete switch of FIGS. 9a (and 10b) requires a total of two gratings 901 and 903 (1001 and 1003). On the other hand, by folding the arrangement of FIG. 7a, and using reflective (instead of transmissive) modulators, a single grating may be used in FIGS. 9a and 10b. This is shown in FIG. 9c, where the reflective signal path 911, from reflective modulator array 902, passes through grating 901 to receiver 913 via path 912. Notice an advantage of the arrangement of FIG. 7a is that it offers broadcasting capability, since several lasers can transmit to the same modulator which can be designed so that the same modulating signal is applied to several laser wavelengths, which are broadcasted to different receivers.

Figure 11:
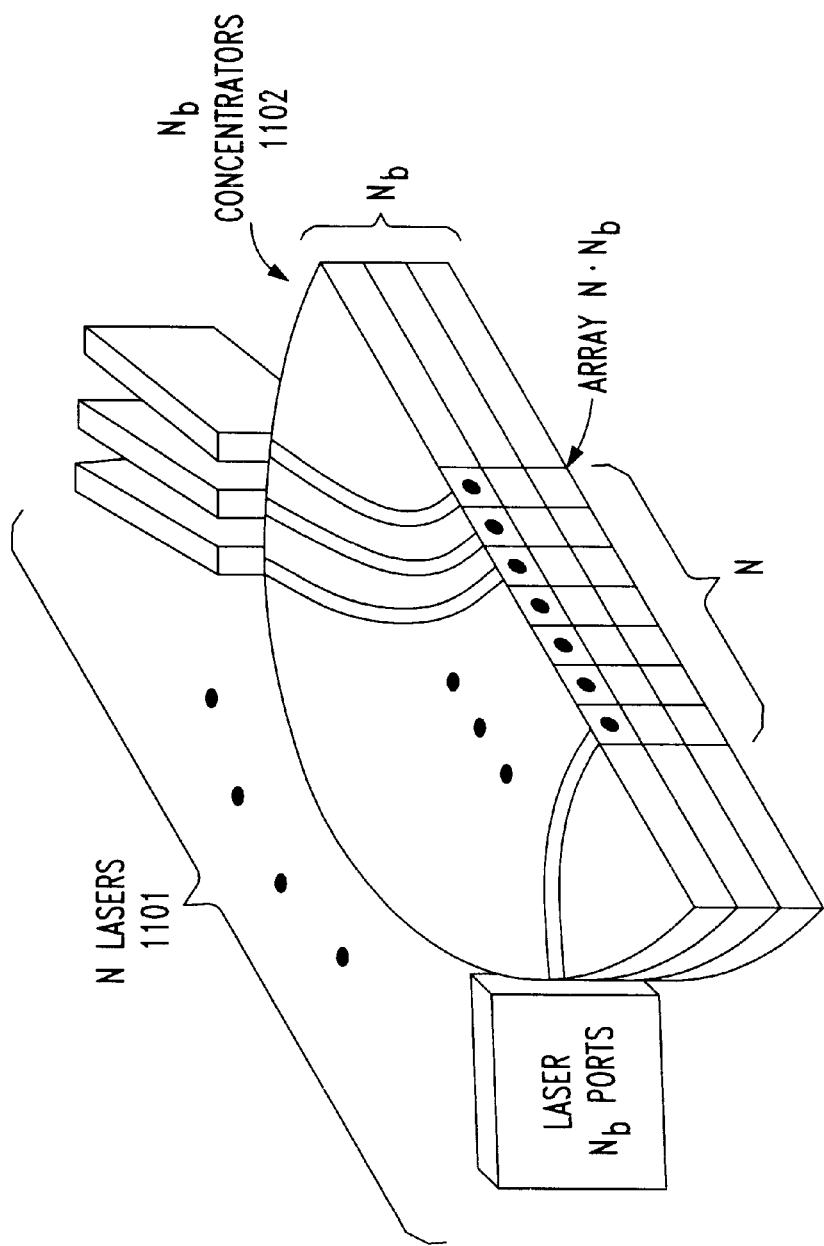
FIG. 11 shows a perspective view of a set of N lasers connected to a set of concentrators.

As shown in FIG. 11, in practice, it is generally convenient to combine the lasers 1101 with suitable concentrators 1102 to obtain a rectangular array of closely spaced elements arranged in parallel rows, so that each row includes a particular port of each laser. Notice, if each laser produces the wavelengths of FIG. 10a, each receiver can be realized efficiently by including in the receiver a suitable multiplexer (a $N \times 1$ wavelength router) connecting the $N_b$ input waveguides of the receiver to a photodiode. With reference to FIG. 9a, there is shown a simpler arrangement obtained by simply using a combiner 906 to couple signals from each of the $N_b$ input waveguides to the photodiode 907. As shown in more detail in FIG. 9b, the $N_b$ wavelengths of the receiver array 905 are simply directed to a common focal point F located at the center of the photodiode 907. Thus, one combiner 906 and one photodiode 907 would be used for each receiver. Alternatively, a separate photodiode can be used for each of the $N_b$ waveguides of each receiver, and the $N_b$ output data lines from the $N_b$ photodiodes can be combined electronically before being combined electronically. Alternatively, the combiner 906 can be eliminated and a separate photodiode can be used for each of the $N_b$ waveguides of each receiver. The $N_b$ photodiodes can then be combined electronically. Notice only one line at a time is activated.

What has been described is merely illustrative of the application of the principles of the present invention. Other methods and arrangements can be implemented by those skilled in the art without departing from the spirit and scope of the present invention.

APPENDIX

REFERENCES

[1] C. Dragone and I. P. Kaminow, "Rapidly Tunable Integrated Laser," U.S. Pat. No. 5,373,517.

[2] C. Doerr, M. Shiraski and C. H. Joyner, "Chromatic focal plane displacement in parabolic chirped waveguide grating router," IEEE Photon. Technol. Lett., vol. 9, pp.627–635, May 1997.

[3] C. Dragone, "An N×N optical multiplexer using a planar arrangement of two star couplers," IEEE Photon. Technol. Lett., vol. 3, pp.812–815, September 1991.

[4] C. Dragone, Pending Patent Application "Monitoring with an optical Wavelength Router," filed on Feb. 24, 1997.

What is claimed is:

1. A broadband electronic N×N cross-connect switch comprising a set of N selectively activated lasers, each laser capable of producing N different wavelengths;

a first coupling unit for coupling the N wavelengths produced by the N lasers to a set of N modulators;

a second coupling unit for coupling the set of N modulators to a set of N receivers;

said set of modulators modulating the N wavelengths using N input electrical signals, each modulator being selectable by choosing a laser wavelength; and a set of N receivers coupled to receive the N modulated wavelengths from said set of modulators and for detecting the N modulated wavelengths and generating N output electrical signals therefrom, each receiver receiving and detecting a different one of the N different wavelengths, and wherein by selecting a laser wavelength a particular modulator and receiver pair is selected so that a modulated signal, formed at the selected modulator when an input electrical signal modulates the selected wavelength, is switched to the selected receiver.

2. The broadband electronic N×N cross-connect switch of claim 1 wherein the first coupling unit connects each laser to one particular modulator.

3. The broadband electronic N×N cross-connect switch of claim 1 wherein the first coupling unit is a wavelength router capable of connecting each laser to any particular modulator, which can be selected using the laser controls.

4. The broadband electronic N×N cross-connect switch of claim 1 wherein at least one of the set of lasers includes $N_a+N_b$ controls for producing $N_aN_b=N$ wavelengths.

5. The broadband electronic N×N cross-connect switch of claim 4 wherein any particular laser can transmit to any particular modulator by selecting one each of said $N_a$ and $N_b$ controls.

6. The broadband electronic N×N cross-connect switch of claim 1 wherein $N=N_aN_b$ and each laser is capable of producing $N_aN_b$ wavelengths and includes $N_b$ ports, each port for outputting $N_a$ wavelengths, $N_a$ controls for selecting a particular wavelength at each port, and $N_b$ controls for selecting a particular port.

7. The broadband electronic N×N cross-connect switch of claim wherein each of the first and second coupling units is a mirror image of the other, so that a set of paths from a particular laser all connect to the same receiver and any modulator in one of the paths can be selected by selecting one each of said $N_a$ and $N_b$ controls.

8. The broadband electronic N×N cross-connect switch of claim 1 wherein at least one of the receivers includes a combiner having several ports to couple a received signal to a single photodiode.

9. The broadband electronic N×N cross-connect switch of claim 1 wherein the first coupling unit includes a concentrator connected to the lasers to form an array of closely spaced elements, each element connected to a particular laser.

10. The broadband electronic N×N cross-connect switch of claim 1 wherein at least one of the first and second coupling units is a free-spaced grating.

11. The broadband electronic N×N cross-connect switch of claim 7 wherein the first coupling unit, said set of modulator and the second coupling unit form an interconnection arrangement between the lasers and the receivers having $N_b$ layers, each layer including one port of each laser, one port of each receiver, a set of $N_a$ modulators, an $N \times N_a$ router between the lasers and modulators, and an $N_a \times N$ router between the modulators and receivers.

12. The broadband electronic N×N cross-connect switch of claim 1 wherein said set of modulators are reflective modulators and wherein said first and second coupling units are part of the same coupling unit.

13. The broadband electronic N×N cross-connect switch of claim 1 arranged as an electronic data cross-bar switch, further comprising a group of input optical receivers, each receiver for detecting a received modulated optical signal and for generating one of the N input electrical signals;

a group of output optical transmitters, each transmitter for generating N modulated optical signals from the N output electrical signals optical signal; and at least one port selected from a set of ports including (1) an add port for adding an input electrical signal which is switched to one of said group of output optical transmitters and (2) a drop port for dropping an output electrical signal which was inputted by one of said group of input optical receivers.

14. The broadband electronic N×N cross-connect switch of claim 1 arranged as a space-wavelength cross-connect which allows connectivity between any wavelength of an input fiber and wavelength of an output fiber, the cross-connect switch further comprising an input demultiplexer for each input optical fiber connected to the cross-connect switch for demultiplexing modulated wavelengths received on that fiber;

at least one optical receiver for detecting a received modulated wavelength and for generating one of the N input electrical signals;

at least one optical transmitter for modulating a wavelength to be sent over an output fiber using one of the N output electrical signals; and an output multiplexer for each output optical fiber connected to the cross-connect switch for multiplexing together modulated wavelengths received from the at least one optical transmitter for transmission over that fiber.

15. A method of operating a broadband electronic N×N cross-connect switch, comprising the steps of selectively producing N wavelengths at each of N lasers;

modulating at N modulators each of the N wavelengths using a different one of N input electrical signals, each modulator being chosen by a selected wavelength of a laser; and separately receiving and detecting at each of the N receivers each of the N modulated wavelengths, each receiver being chosen by the selected wavelength.

* * * * *